United States Patent Office 3,776,900
Patented Dec. 4, 1973

3,776,900
STABILIZATION OF REDUCED COENZYMES
Frank E. Hammer, Chicago, Ill., assignor to
G. D. Searle & Co., Chicago, Ill.
No Drawing. Filed Apr. 26, 1971, Ser. No. 137,687
Int. Cl. C07d 51/52
U.S. Cl. 260—211.5 R     12 Claims

ABSTRACT OF THE DISCLOSURE

Stabilization of reduced coenzymes such as reduced diphosphopyridine nucleotide and reduced triphosphopyridine nucleotide is achieved by dissolving the reduced coenzyme in a solvent mixture consisting of a water-soluble alkanol and a water-soluble polyhydroxy alcohol.

---

The present invention is concerned with the stabilization of reduced coenzymes and, more particularly, with compositions containing those reduced coenzymes. Typical coenzymes are the reduced forms of diphosphopyridine nucleotide (DPNH) and triphosphopyridine nucleotide (TPNH). The compositions consist of a solution of the reduced coenzyme in an organic solvent mixture consisting of a water-soluble alkanol and a water-soluble polyhydroxy alcohol.

Representative of water-soluble alkanols are methanol, ethanol, n-propanol and isopropanol. Methanol is particularly preferred. Suitable water-soluble polyhydroxy alcohols are ethylene glycol and glycerol. Glycerol is especially advantageous. The preferred mixtures have a viscosity and specific gravity close to that of water, thus making measurement and transfer of small quantities of the solution more convenient.

Coenzymes such as diphosphopyridine nucleotide (DPN) and triphosphopyridine nucleotide (TPN), either in the oxidized or reduced forms, are useful as a result of their ability to catalyze enzymatic reactions. Enzymes themselves are catalysts which enable many complex chemical reactions to take place under ordinary conditions of temperature and pressure. Diphosphopyridine nucleotide and triphosphopyridine nucleotide are particularly useful in reactions involving the class of enzymes known as dehydrogenases. Dehydrogenases are those enzymes which result in a transfer of the elements of hydrogen from one substrate to another. The pyridine nucleotides are suitable for such reactions in view of their ability to gain or lose protons.

Lactic dehydrogenase (LDH) is a particularly important enzyme which utilizes one of the coenzymes of the present invention. That enzyme catalyzes the reversible oxidation of L-α-hydroxy monocarboxylic acids such as L-lactic acid. That transformation is represented as follows:

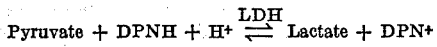
Pyruvate + DPNH + H+ $\rightleftharpoons$ Lactate + DPN+

Where an unknown quantity of pyruvate is to be determined, appropriate amounts of reduced diphosphopyridine nucleotide and lactic acid dehydrogenase are incubated in an appropriately buffered solution to result in the formation of lactate and diphosphopyridine nucleotide. When lactate is to be determined, appropriate amounts of diphosphopyridine nucleotide and lactic acid dehydrogenase are incubated in an appropriately buffered solution and the reaction is allowed to proceed with the formation of pyruvate and the reduced diphosphopyridine nucleotide. When lactic acid dehydrogenase is the unknown, the sample of material thought to contain lactic acid dehydrogenase is incubated in an appropriately buffered mixture with either pyruvate and reduced diphosphopyridine nucleotide or lactate and diphosphopyridine nucleotide. The terms "pyruvate" and "lactate" refer, respectively, to the anions $CH_3COCOO^-$ and $CH_3CHOHCOO^-$, which are present in the aqueous solution. The determination of the presence of lactic acid dehydrogenase, pyruvate and lactate has been used for various purposes in clinical chemistry.

A convenient method for determining lactic acid dehydrogenase activity is to follow the rate of absorbance change at 340 m$\mu$, the absorption peak of reduced diphosphopyridine nucleotide. Diphosphopyridine nucleotide has no absorbance at that wave length. When using lactate and diphosphopyridine nucleotide as substrates, the rate of increase of $A_{340}$ is measured. When using pyruvate and reduced diphosphopyridine nucleotide as substrates, the rate of decrease of $A_{340}$ is measured. When determining amounts of lactate or pyruvate in complex mixtures, the amounts of these substances can be calculated from the change in $A_{340}$. Although 340 nanometers is the normally used wave length for determination, higher and lower wave lengths have been used such as 336 and 366 nanometers.

The above described lactic dehydrogenase system can be used also to determine the activity of other enzymes, e.g. glutamic-pyruvic transaminase (GPT). That enzyme catalyzes the following reaction:

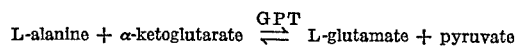
L-alanine + α-ketoglutarate $\overset{GPT}{\rightleftharpoons}$ L-glutamate + pyruvate The activity of an unknown amount of glutamic-pyruvic transaminase can thus be determined by adding to the above reaction mixture appropriate amounts of reduced diphosphopyridine nucleotide and lactic dehydrogenase, then determining the rate of change of absorbance of the reduced diphosphopyridine nucleotide at about 340 nanometers. Likewise, in the determination of creatine phosphokinase (CPK), which catalyzes the following reaction:

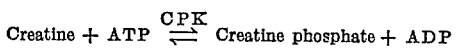
Creatine + ATP $\overset{CPK}{\rightleftharpoons}$ Creatine phosphate + ADP there can be added to the system phosphoenolpyruvate and phosphokinase to result in the reaction

ADP + phosphoenolpyruvate $\rightleftharpoons$ ATP + pyruvate

Thus the rate of change in absorbance at 340 nanometers upon the addition of appropriate amounts of reduced diphosphopyridine nucleotide and lactic dehydrogenase to the system serves as an indicator of the creatine phosphokinase activity.

The instant coenzymes are extremely sensitive to changes in pH. The reduced forms thus are rapidly destroyed at acidic pH's while the oxidized forms are destroyed at alkaline pH's. In order to obtain a solution of the reduced form, for example, which can be stored for long periods of time without significant loss in activity, it has been necessary to maintain the pH at a carefully controlled value by the addition of certain buffering agents. That careful control of pH is, however, obviated by the present invention which consists of the stabilization of reduced coenzymes in a mixed solvent containing a water-soluble alkanol and a water-soluble polyhydroxy alcohol as hereinbefore defined. While not necessary, the pH of those organic solutions can be controlled also by the addition of buffering agents so as to maintain the pH at about 9. Suitable buffering agents are 2-amino-2-methyl-1-propanol and tris-hydroxymethylaminomethylmethane. The latter buffer is particularly preferred.

For maximum stability and ease of utilization the proportion of alkanol/polyhydroxyl alcohol preferred is between 30:70 and 50:50 (expressed in terms of relative volumes). The especially preferred solvent system consists of equivolume quantities of methanol and glycerol. The concentration of coenzyme in the solution varies preferably within the range of 15–30 mg./ml. A concentration of about 20 mg./ml. is, however, especially preferred.

A number of methods can be used to determine the stability of the reduced coenzymes in the instant solvent system. The decrease in absorbance as a function of storage time at 340 nanometers is one procedure. A second procedure utilizes the change in absorbance at 340 nanometers, but in a system containing also pyruvate substrate and lactic dehydrogenase. The absorbance at 340 nanometers is measured before and after addition of lactic dehydrogenase and the difference between the two values provides a measurement of oxidizable diphosphopyridine nucleotide present. A third method involves the measurement, at about 540 nanometers, of the pyruvate 2,4-dinitrophenylhydrazone which remains after reacting pyruvate with lactic dehydrogenase and reduced diphosphopyridine nucleotide. The 2,4-dinitrophenylhydrazine is added to the reaction mixture afterwards to form the pyruvate 2,4-dinitrophenylhydrazone.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art.

EXAMPLE 1

The test solutions are prepared by dissolving 100 mg. of reduced diphosphopyridine nucleotide in 5 ml. of the appropriate solvent. The following ethylene glycol/methanol solvent mixtures are used:

| Solution | Ethylene glycol (ml.) | Methanol (ml.) |
|---|---|---|
| 1 | 100 | 0 |
| 2 | 90 | 10 |
| 3 | 70 | 30 |
| 4 | 50 | 50 |
| 5 | 30 | 70 |
| 6 | 10 | 90 |

In addition, an aqueous solution is prepared for comparison purposes.

The solutions are assayed by each of the following procedures, then are stored at room temperature in the dark. At the indicated storage times, the solutions are again assayed.

PROCEDURE 1

50 μl. of the reduced diphosphopyridine nucleotide solution is mixed with 10 ml. of deionized water and the absorbance of the diluted solution is measured in a 1 cm. cell at 340 nanometers with a Gilford No. 2400 spectrophotometer. Water is used to null the spectrophotometer. The reduced diphosphopyridine nucleotide concentration is calculated from its extinction coefficient of $6.22 \times 10^6$.

PROCEDURE 2

50 μl. of the reduced diphosphopyridine nucleotide solution is mixed with 10 ml. of pyruvate substrate (contains 87.5 mg. sodium pyruvate/l. adjusted to pH 7.4 with 0.1 M phosphate buffer) and 3 ml. of that solution is transferred to a 1 cm. quartz cell. The initial absorbance at 340 nanometers is measured with a Gilford spectrophotometer, using water to null the spectrophotometer. 20 μl. of lactic dehydrogenase solution (prepared fresh by diluting 100 μl. of 5 mg./ml. lactic dehydrogenase to 50 ml. with deionized water) is then added and the absorbance is again measured after the completion of the reaction. The results are expressed as percent reoxidation potential as determined by the following formula:

$$\frac{\text{initial } A_{340} - \text{final } A_{340}}{\text{initial } A_{340}} \times 100 = \text{percent reoxidation potential}$$

PROCEDURE 3

To 1 ml. of pyruvate substrate (contains 87.5 mg. sodium pyruvate/l. and adjusted to pH-7.4 with 0.1 M phosphate buffer) is added .05 ml. of the reduced diphosphopyridine nucleotide solution and the mixture is kept at 37° C. for about 5 minutes. 0.2 ml. of Versatol E (Warner-Chilcott product containing 343 Wacker units of lactic dehydrogenase/ml.) is added and incubation at 37° is continued for 30 minutes. At the end of that time, 1 ml. of $10^{-3}$ M 2,4-dinitrophenylhydrazine in 1.0 N hydrochloric acid is added and the mixture is allowed to stand for 20 minutes. 10 ml. of 0.4 N aqueous sodium hydroxide is then added, the mixture is allowed to stand for 1–25 minutes, and the absorbance at 540 nanometers is measured, using water as the reference. From the absorbancies the concentration of lactic dehydrogenase in each solution is calculated from the standard curve prepared as follows:

| Tube | Pyruvate substrate (ml.) | Water (ml.) | Units lactic acid dehydrogenase | Typical $A_{540}$ |
|---|---|---|---|---|
| 1 | 1.0 | 0.1 | 0 | 0.54 |
| 2 | 0.8 | 0.3 | 280 | 0.46 |
| 3 | 0.6 | 0.5 | 640 | 0.36 |
| 4 | 0.4 | 0.7 | 1,040 | 0.25 |
| 5 | 0.2 | 0.9 | 1,530 | 0.14 |
| 6 | 0.1 | 1.0 | 2,000 | 0.08 |

To each tube 1 ml. of $10^{-3}$ M 2,4-dinitrophenylhydrazine in 1 N hydrochloric acid is added and the solution is kept at room temperature for 20 minutes. 10 ml. of 0.4 N aqueous sodium hydroxide is then added, the mixture is allowed to stand for 1–25 minutes, and the absorbance at 540 nanometers is measured, using water as the reference. Absorbance versus test units is plotted on rectangular cartesian coordinates.

When the test solutions were assayed by each of the latter procedures the following results were obtained:

PROCEDURE 1

| Hours | Solution 1 | 2 | 3 | 4 | 5 | 6 | Water |
|---|---|---|---|---|---|---|---|
| 0 | .679 | .663 | .674 | .675 | .718 | .725 | .675 |
| 48 | .679 | .664 | .703 | .681 | .686 | .677 | .677 |
| 120 | .648 | .661 | .662 | .665 | .668 | .518 | .512 |
| 216 | .634 | .647 | .655 | .673 | .654 | .377 | .361 |
| 384 | .457 | .484 | .500 | .541 | .498 | .154 | .139 |

PROCEDURE 2

SOLUTION 1

| Hours | Initial A | Final A | Percent reoxidation potential |
|---|---|---|---|
| 0 | .721 | .048 | 93 |
| 48 | .863 | .030 | 95 |
| 120 | .658 | .054 | 92 |
| 216 | .635 | .090 | 86 |
| 384 | .483 | .117 | 76 |

SOLUTION 2

| Hours | Initial A | Final A | Percent reoxidation potential |
|---|---|---|---|
| 0 | .697 | .047 | 93 |
| 48 | .697 | .037 | 95 |
| 120 | .662 | .055 | 92 |
| 216 | .646 | .105 | 84 |
| 384 | .495 | .105 | 79 |

SOLUTION 3

| Hours | Initial A | Final A | Percent reoxidation potential |
|---|---|---|---|
| 0 | .710 | .049 | 93 |
| 48 | .691 | .033 | 95 |
| 120 | .673 | .054 | 92 |
| 216 | .670 | .087 | 87 |
| 384 | .525 | .102 | 80 |

PROCEDURE 2—Continued

SOLUTION 4

| Hours | Initial A | Final A | Percent reoxidation potential |
|---|---|---|---|
| 0 | .707 | .041 | 94 |
| 48 | .695 | .032 | 95 |
| 120 | .658 | .055 | 92 |
| 216 | .613 | .072 | 88 |
| 384 | .558 | .092 | 84 |

SOLUTION 5

| Hours | Initial A | Final A | Percent reoxidation potential |
|---|---|---|---|
| 0 | .739 | .069 | 91 |
| 48 | .722 | .038 | 95 |
| 120 | .662 | .057 | 91 |
| 216 | .625 | .089 | 86 |
| 384 | .493 | .091 | 82 |

SOLUTION 6

| Hours | Initial A | Final A | Percent reoxidation potential |
|---|---|---|---|
| 0 | .737 | .047 | 94 |
| 48 | .712 | .037 | 96 |
| 120 | .542 | .067 | 88 |
| 216 | .376 | .117 | 69 |
| 384 | .164 | .082 | 50 |

Water

| Hours | Initial A | Final A | Percent reoxidation potential |
|---|---|---|---|
| 0 | .721 | .049 | 93 |
| 48 | .674 | .047 | 93 |
| 120 | .494 | .090 | 82 |
| 216 | .361 | .084 | 77 |
| 384 | .117 | .077 | 34 |

EXAMPLE 2

The test solution is prepared by dissolving 100 mg. of reduced diphosphopyridine nucleotide in a mixture containing 2.5 ml. of methanol and 2.5 ml. of glycerol. An aqueous solution containing 100 mg. of reduced diphosphopyridine nucleotide in 5 ml. of water is prepared for comparison purposes.

Both solutions are assayed by procedures 1, 2 and 3 described in Example 1, then are stored at room temperature in the dark and again assayed at the indicated storage time.

The results of those assays are shown below:

PROCEDURE 1

| Hours | Glycerol/methanol (absorbance units) | Water (absorbance units) |
|---|---|---|
| 0 | 0.72 | 0.77 |
| 48 | 0.70 | 0.72 |
| 144 | 0.69 | 0.58 |
| 216 | 0.67 | 0.36 |
| 408 | 0.59 | 0.15 |
| 524 | 0.55 | 0.04 |

PROCEDURE 2

Glycerol/methanol

| Hours | Initial A | Final A | Percent reoxidation potential |
|---|---|---|---|
| 0 | 0.75 | 0.06 | 92 |
| 48 | 0.72 | 0.03 | 96 |
| 144 | 0.72 | 0.06 | 92 |
| 216 | 0.71 | 0.08 | 88 |
| 408 | 0.64 | 0.08 | 87 |
| 524 | 0.57 | 0.10 | 83 |

Water

| Hours | Initial A | Final A | Percent reoxidation potential |
|---|---|---|---|
| 0 | 0.79 | 0.04 | 94 |
| 48 | 0.73 | 0.04 | 95 |
| 144 | 0.64 | 0.11 | 83 |
| 216 | 0.36 | 0.10 | 71 |
| 408 | 0.18 | 0.08 | 56 |
| 524 | 0.06 | 0.06 | 0 |

PROCEDURE 3

| Hours | Glycerol/methanol (units lactic dehydrogenase) | Water (units lactic dehydrogenase) |
|---|---|---|
| 0 | 967 | 1,030 |
| 48 | 910 | 905 |
| 144 | 1,000 | 780 |
| 216 | 960 | 635 |
| 408 | | 188 |
| 446 | 870 | 68 |
| 524 | 755 | |

EXAMPLE 3

In order to determine the pH at which the coenzyme solutions are maximally stable, the following solutions are prepared:

(1) 100 mg. of reduced diphosphopyridine nucleotide dissolved in a mixture consisting of 2.5 ml. of methanol and 2.5 ml. of glycerol.

(2) 0.4457 g. 2-amino-2-methyl-1-propanol dissolved in 100 ml. distilled water, pH adjusted to 10.5.

(3) 0.4457 g. 2-amino-2-methyl-1-propanol dissolved in 100 ml. distilled water, pH adjusted to 9.0.

(4) 0.4457 g. 2-amino-2-methyl-1-propanol dissolved in 100 ml. of 50:50 methanol-glycerol and containing 2 g. of reduced diphosphopyridine nucleotide, pH adjusted to 10.5.

(5) 0.4457 2-amino-2-methyl-1-propanol dissolved in 100 ml. of 50:50 methanol-glycerol and containing 2 g. of diphosphopyridine nucleotide, pH adjusted to 9.0.

(6) 0.6055 g. tri-hydroxymethylaminomethane dissolved in 100 ml. of 50:50 methanol-glycerol and containing 2 g. of reduced diphosphopyridine nucleotide, pH adjusted to 9.0.

(7) Deionized, distilled water

Assay of these solutions by Procedures 1 and 3 described hereinbefore produce the following results:

PROCEDURE 1

| Hours | Solution 1 | 2 | 3 | 4 | 5 | 6 | 7 |
|---|---|---|---|---|---|---|---|
| 0 | .787 | .811 | .795 | .781 | .761 | .755 | .804 |
| 96 | .814 | .790 | .801 | .770 | .832 | .750 | .727 |
| 168 | .793 | .781 | .793 | .793 | .765 | .778 | .616 |
| 360 | .736 | .735 | .759 | .735 | .725 | .759 | .358 |
| 624 | .682 | .692 | .727 | .742 | .699 | .700 | .136 |

PROCEDURE 3

| Hours | Solution 1 | 2 | 3 | 4 | 5 | 6 | 7 |
|---|---|---|---|---|---|---|---|
| 0 | 974 | 876 | 1,010 | 922.5 | 960 | 972.5 | 1,022.5 |
| 96 | 960 | 420 | 775 | 705 | 885 | 955 | 895 |
| 168 | 967.5 | 410 | 725 | 725 | 962.5 | 1,010 | 857.5 |
| 360 | 912.5 | 440 | 675 | 667 | 818 | 887.5 | 620 |
| 624 | 718.5 | 492.5 | 668.5 | 764 | 861 | 886.5 | 351.5 |

From the foregoing experiments it is determined that maximum stability is achieved at pH 9, using tris-hydroxymethylaminomethane as the buffer.

What is claimed is:

1. A solution consisting of a coenzyme selected from the group consisting of reduced diphosphopyridine nucleotide and reduced triphosphopyridine nucleotide dissolved in a mixture consisting of a water-soluble alcohol and water-soluble polyhydroxy alcohol, wherein the ratio of water-soluble alcohol to water-soluble polyhydroxy alcohol is from 10/90 to 70/30.

2. The solution of claim 1 containing, in addition, a buffer sufficient to maintain the mixture at a pH of about 9.

3. The solution of claim 1, wherein the coenzyme is reduced diphosphopyridine nucleotide.

4. The solution of claim 1 wherein the water-soluble alcohol is methanol.

5. The solution of claim 1 wherein the water-soluble polyhydroxy alcohol is glycerol.

6. The solution of claim 1 wherein the water-soluble polyhydroxy alcohol is ethylene glycol.

7. The solution of claim 1, wherein the water-soluble alcohol is methanol and the water-soluble polyhydroxy alcohol is glycerol.

8. The solution of claim 1, wherein the coenzyme is reduced diphosphopyridine nucleotide, the water-solution alcohol is methanol and the water-soluble polyhydroxy alcohol is glycerol.

9. The solution of claim 1, wherein the coenzyme is reduced diphosphopyridine nucleotide, the water-soluble alcohol is methanol, the water-soluble polyhydroxy alcohol is glycerol and the methanol and glycerol are present in equivolume quantities.

10. The solution of claim 1, wherein the water-soluble alcohol is methanol, the water-soluble polyhydroxy alcohol is glycerol, the ratio of the volume of methanol present to the volume of glycerol present is between 30:70 and 50:50.

11. The solution of claim 1, wherein the coenzyme is reduced diphosphopyridine nucleotide, the water-soluble alcohol is methanol, the water-soluble polyhydroxy alcohol is glycerol, the methanol and glycerol are present in equivolume quantities and the reduced diphosphopyridine nucleotide is present in a concentration of 15–30 mg./ml.

12. The solution of claim 1, wherein the coenzyme is reduced diphosphopyridine nucleotide, the water-soluble alcohol is methanol, the water-soluble polyhydroxy alcohol is glycerol, the methanol and glycerol are present in equivolume quantities and the reduced diphosphopyridine nucleotide is present in a concentration of about 20 mg./ml.

References Cited

UNITED STATES PATENTS

| | | | |
|---|---|---|---|
| 3,158,540 | 11/1964 | O'Hollaren | 260—211.5 R |
| 3,266,989 | 8/1966 | O'Hollaren | 260—211.5 R |

LEWIS GOTTS, Primary Examiner

J. R. BROWN, Assistant Examiner